Nov. 30, 1926.

E. L. SCHUMACHER 1,608,674

OPHTHALMIC MOUNTING

Filed Sept. 8, 1925

Inventor
Elmer L. Schumacher.
By Harry H. Styll
Attorney

Patented Nov. 30, 1926.

1,608,674

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed September 8, 1925. Serial No. 55,013.

This invention relates to new and useful improvements in ophthalmic mountings, and consists of a new and novel construction of temple, together with means for securing the same to the lens rims of a spectacle.

It is well known that in spectacles heretofore provided, the temple connection employed in conjunction therewith has proven very unreliable for the reason that it is very apt to work loose, with the result that the temple becomes loose and wobbly. Moreover, some difficulty has also been encountered in connection with prior art constructions of this character in that the screws, which act as the pivots for the temples, very frequently work out due to the fact that the screw is constantly being acted upon by the temple as it moves about its pivot. The purpose of the present invention, therefore, is to overcome these disadvantages.

One of the primary objects of the present invention is to provide means for increasing the bearing surface of the temple connections, thereby reducing to a minimum any chances of the temple connection becoming loose and wobbly.

Another object is to provide such a mounting having means for removing bearing friction from the temple securing means, whereby to prevent the said securing means from backing out.

Another object is to provide means for easily and quickly centering the temple when securing the same to the lens rims.

Another object is to prevent wobbly and loose fitting temples, which are liable to get out of alignment.

Another object is to provide such a mounting which will be strong and durable in its construction and also compact and neat appearing.

Another object is to provide an end piece construction which will retain its alignment and trueness of working parts during use.

Other objects and advantages will become more readily apparent from the course of the following description when taken in connection with the accompanying drawings.

Referring to the drawings, in which similar characters are used to designate corresponding parts throughout:

Figure 1:
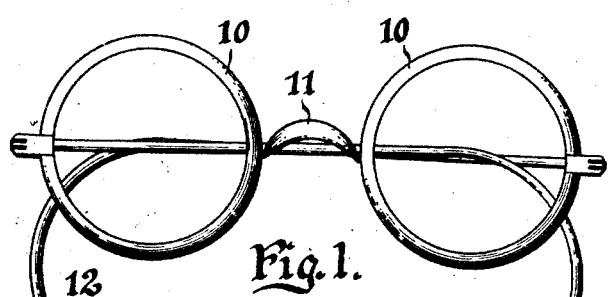
Figure 1 is a front view of a pair of spectacles embodying the present invention.
Figure 2:
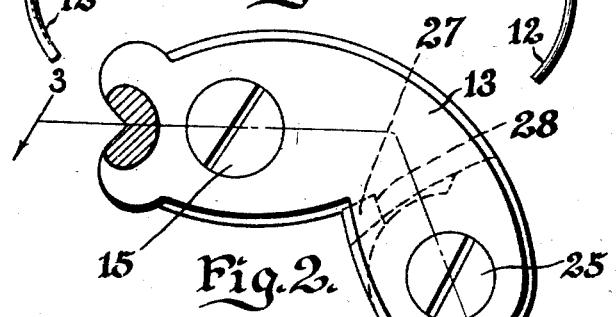
Figure 2 is a top plan view of the temple connection.

With reference to the accompanying drawings, the numeral 10 denotes a pair of lens rims of an ordinary spectacle held together by means of the bridge 11 and supported on the face of the wearer by the temples 12. Each of the lens rims 10 is split and terminates in the separated end pieces 13 and 14, which are held together by the screw 15.

The end pieces 13 and 14 are formed with the oppositely disposed hinge recesses 16 and 17 respectively and received within these recesses are the spaced hinged ears 18 and 19 of the temple 12. Loosely positioned between the ears 18 and 19 is a washer 20 which remains stationary during the movement of the temple. Secured within the end piece 14 and loosely received within the opening 21 in the hinge ear 19 is the bushing 22, while secured within the washer 20 and loosely received within the opening 23 in the hinge ear 18 is a second bushing 24, which is vertically aligned with the bushing 22. A retaining screw 25 passing through said end pieces and bushings firmly secures the said temple within said end pieces. The bushings 22 and 24 act as a bearing for the temple ears, thereby removing the bearing surface from the screw 25 and thereby taking away any tendency of the screw to back out due to the movement of the temple on its pivot. The washer 20 extends slightly beyond the ears 18 and 19 as indicated at 27 which extended portion is received within the recess 28 in the end piece 14 whereby to prevent said washer from turning as the temple is moved about its pivot.

Figure 3:
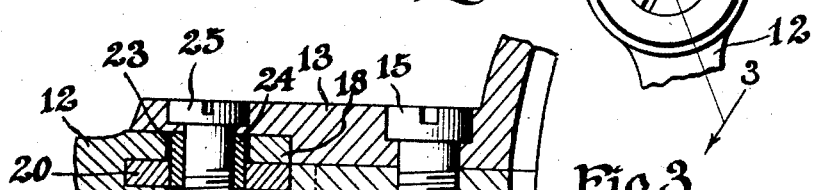
Figure 3 is a sectional view on line 3—3 of Figure 2.
Figure 4:
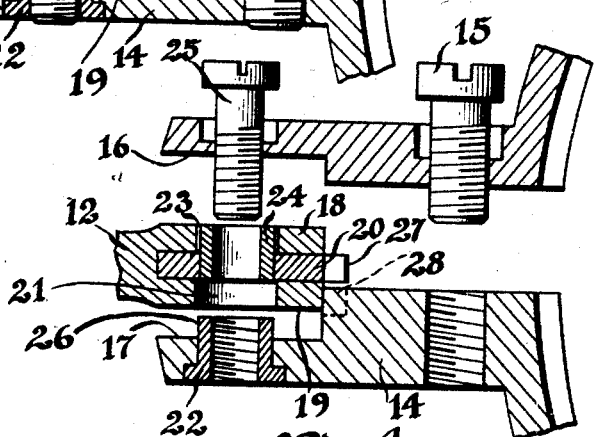
Figure 4 is a similar sectional view showing the parts before assembling.

The operation and functions of the invention are as follows:

The bushing 22 is first secured within the end piece 14 and the washer 20 is then positioned between the hinge ears 18 and 19 and the bushing 24 secured therein. The hinge ears are inserted between the end pieces and the projecting portion 26 of the bushing 22 is received within the opening 21 in the ear 19. The end pieces are then brought together so that they abut one against the other as shown in Figure 3 and are secured in this position by the screw 15. The retaining screw 25 is then passed through the said end pieces and bushings whereby to retain the temple within the hinge recesses.

From the foregoing description, it will be seen that there has been provided a temple connection having increased bearing surface, and that the bearing of the temple on the pivot screw, with the tendency to back out said screw, has been avoided, that means has also been provided for centering the temple when it is assembled in connection with the end piece, and that a strong, sturdy and neatly finished end piece has been provided.

It will, of course, be understood that various modifications may be found desirable when producing this mounting commercially, and the right is hereby reserved to make such changes in the construction and arrangement of the various parts as properly fall within the scope of the appended claims without departing from or exceeding the spirit of the invention.

What is claimed is:

1. An ophthalmic mounting comprising a lens rim end-piece having a hinge recess, a temple having pivot ears mounted in said recess, a washer positioned between said ears, and a bushing carried by said washer and loosely received within one of said pivot ears.

2. An ophthalmic mounting comprising a lens rim end-piece having a hinge recess, a temple having pivot ears mounted in said recess, a bushing secured within said endpiece and loosely received within one of said ears, a washer positioned between said ears and a bushing secured within said washer and loosely received within the other of said ears.

3. An ophthalmic mounting comprising a lens rim endpiece having a hinge recess, a temple having pivot ears in said recess, a bushing secured to said endpiece and loosely received within one of said ears, a washer positioned between said ears, a bushing secured to said washer and loosely received within the other of said ears, and a retaining screw passing through said endpiece, and bushings, said washer and bushings remaining stationary during movement of said temple ears.

4. In an ophthalmic mounting, the combination with a lens rim endpiece having a hinge recess, of a temple having pivot ears mounted in said recess, a washer between said ears and a bushing carried by said washer and loosely received within one of said ears.

5. In an ophthalmic mounting, a temple adapted to be secured within a lens rim endpiece, said temple comprising a pair of spaced hinge ears, a washer loosely positioned between said spaced ears, and a bushing secured within said washer and loosely received within one of said ears.

ELMER L. SCHUMACHER.